United States Patent
Singh et al.

(10) Patent No.: US 9,667,452 B2
(45) Date of Patent: May 30, 2017

(54) MECHANISM FOR INTEGRATING APPLICATION DATA WITH AVAILABLE BANDWIDTH ESTIMATION TOOLS FOR CLOUD COMPUTING ENVIRONMENTS

(75) Inventors: Alok Singh, Chennai (IN); Vinodkumar Gopinath, Chennai (IN); Badrinath Sriram, Chennai (IN); Venu Gopalraju Kanumari, Chennai (IN)

(73) Assignee: NOVATIUM SOLUTIONS (P) LIMITED, Chennai (IN)

( * ) Notice: Subject to any disclaimer, the term of this patent is extended or adjusted under 35 U.S.C. 154(b) by 25 days.

(21) Appl. No.: 13/697,286

(22) PCT Filed: May 10, 2010

(86) PCT No.: PCT/IN2010/000300
§ 371 (c)(1),
(2), (4) Date: Nov. 9, 2012

(87) PCT Pub. No.: WO2011/141922
PCT Pub. Date: Nov. 17, 2011

(65) Prior Publication Data
US 2013/0058248 A1    Mar. 7, 2013

(51) Int. Cl.
*H04L 1/00* (2006.01)
*H04L 12/26* (2006.01)
*H04L 12/28* (2006.01)
*H04L 25/03* (2006.01)

(52) U.S. Cl.
CPC .................................. *H04L 25/03* (2013.01)

(58) Field of Classification Search
CPC ......... H04L 47/10; H04L 43/50; H04L 41/12; H04L 45/02
USPC .................................................. 370/252, 254
See application file for complete search history.

(56) References Cited

U.S. PATENT DOCUMENTS

2011/0176429 A1\* 7/2011 Johnsson et al. ............. 370/241
2012/0170445 A1\* 7/2012 Perumanam et al. ........ 370/216

\* cited by examiner

*Primary Examiner* — Ronald Abelson
(74) *Attorney, Agent, or Firm* — Symbus Law Group LLC; Clifford D. Hyra

(57) ABSTRACT

The present invention relates to a system and method for integrating useful data while measuring available bandwidth between a cloud computing client device and a server farm. More specifically the present invention relates to the method for integrating useful application data carried inside probe packets, by tools that estimate available bandwidth between two nodes connected through the internet (cloud). Importantly, the present invention relates to the method to overcome application data loss that typically happens during the available bandwidth estimation process. Advantageously, the Cloud Computing Environment (CCE) user's internet usage billing reduces significantly and also Available Bandwidth Measurement Tools (ABMT) could be run more frequently without significant increase in billing.

7 Claims, 2 Drawing Sheets

Figure 1:
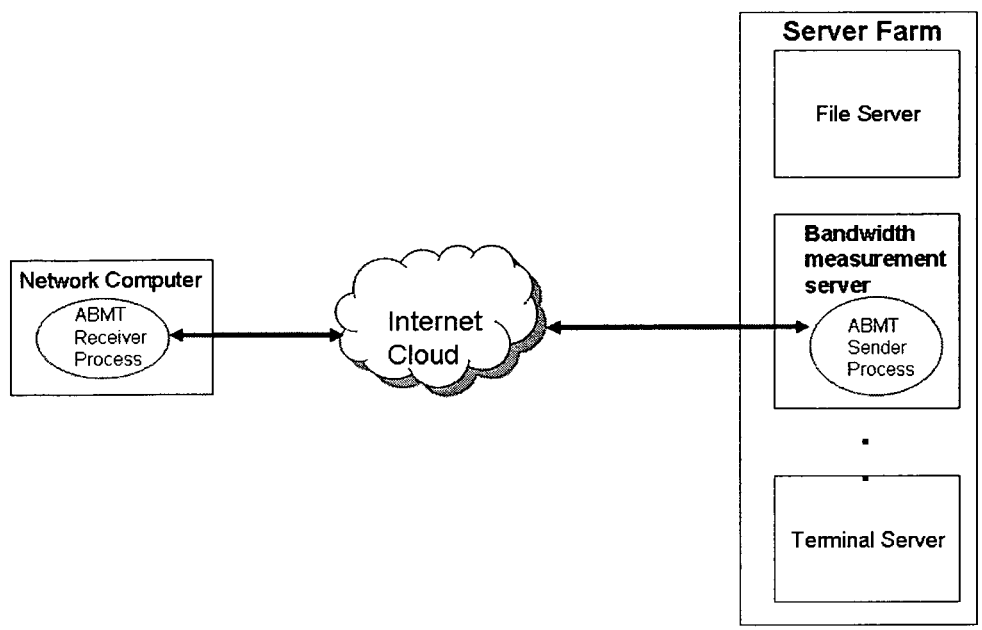

MECHANISM FOR INTEGRATING APPLICATION DATA WITH AVAILABLE BANDWIDTH ESTIMATION TOOLS FOR CLOUD COMPUTING ENVIRONMENTS

FIELD OF INVENTION

The present invention relates to a system and method for integrating useful data while measuring available bandwidth between a cloud computing client device and a server farm. More specifically the present invention relates to the method for integrating useful application data carried inside probe packets, by tools that estimate available bandwidth between two nodes connected through the internet (cloud). Further the present invention relates to the method to overcome application data loss that typically happens during the available bandwidth estimation process. Advantageously, the Cloud Computing Environment (CCE) user's internet usage billing reduces significantly and also Available Bandwidth Measurement Tools (ABMT) could be run more frequently without significant increase in billing.

BACKGROUND

The users of a Cloud Computing Environment (CCE) access some of their computing requirements dynamically. The computing requirements are not necessarily locally resident but are usually accessed across a network. The user uses the resource for the required time and releases these on completion. Thus the resources in this system are shared between a set of users. Thus resource optimization and hence cost optimization is achieved for all the customers and the different players in the Cloud Computing Environment (CCE).

To realize the above mentioned objectives, utility computing utilizes a number of components that provide computing to users, manage the usage and features requested by users and monitor and manage the different physical components in the environment. These components are spread over the three physical components in the environment, viz. a client device at the users end usually referred to as a Network Computer (NC), a Server Farm (SF) and the network (CLOUD) that connects these two components.

The Network Computer (NC) is a simple to use and low power consuming device that is capable of running local and remote applications. This device connects to a server farm to access the native Operating System (OS) applications required by the user. These applications are referred to as Remote Applications (RAPPS). The features in the Network Computer (NC) are configurable and are dynamically managed by the server farm. The server farm consists of two components. One component provides the features and functionality required by the users. The other component manages the complete environment. The network includes the physical network and the protocols that the client and servers use to communicate with each other.

Available Bandwidth (AVB) Between Two End Points:

To provide a predictable user experience for Cloud Computing Environment (CCE) is to adapt the set RAPPs that are made available to the user over the CLOUD, based on the average Available Bandwidth (AVB) between the Network Computer (NC) and the Server Farm (SF). Available Bandwidth (AVB) between two end points in a network is defined as the actual raw bit rate that the end points are successfully able to transfer between them at a given instant of time over the network. Available Bandwidth (AVB) may not necessarily be the same in each direction and it would be different for each direction if the set of links connecting the end points are asymmetric. Also, even for a particular direction, Available Bandwidth (AVB) between two end points may vary every instant based on congestion/cross-traffic in the network and is usually less than the provisioned bandwidth. Hence, it is recommended to use the Available Bandwidth (AVB) rather than the provisioned ones for choosing the set of Remote Applications (RAPPs) for Cloud Computing Environment (CCE) end users.

Good Available Bandwidth Measurement Tools (ABMT) are available to measure instantaneous Available Bandwidth (AVB) between two end points.

Basic Principle of Operation of ABMT:

Most of the Available Bandwidth Measurement Tools (ABMT) estimate the available bandwidth by sending trains/streams of probe IP (Internet Protocol) packets between the two end points/nodes (a sender and a receiver) under consideration. Each packet train consists of a mutually agreed upon number of probe packets. To measure the Available Bandwidth (AVB) in the direction from a sender end point to a receiver end point, these packet trains are sent at different rates from the sender to the receiver. The sender and receiver initially agree on a specific starting packet train rate based on past data or based on the provisioned bandwidth. This rate is then increased or decreased till the Available Bandwidth Measurement Tools (ABMT) converges to a specific range for the Available Bandwidth (AVB). Each packet train consists of a considerable number of probe packets. To maintain a specific transmission rate during a particular packet train, either the packet size (number of bytes within a packet) or the packet inter-transmission time is adjusted so as to achieve the desired rate of transmission per second. The present invention chooses an Available Bandwidth Measurement Tool (ABMT) that adjusts the packet inter-transmission time to achieve the desired rate of transmission per second. Usually, the sender and receiver put their respective timestamps inside each packet when the packets are sent and received respectively. The difference between these values would help the receiver in estimating the delay of the packet in transit (network). Normally, if the packet transmission rate is lesser than or equal to the average Available Bandwidth (AVB) in the cloud, then all packets of a particular train would roughly experience the same amount of transit delay in the network. However, if the packet transmission rate is increased beyond the average Available Bandwidth (AVB), delays of packets within a train start increasing, as packets would typically experience an additional variable queuing delay in intermediate network routers/switches and hence there would be an increasing trend in delay. If the packet transmission rate is increased even further, then beyond a point, the queues of routers/switches get full and they would drop the packets resulting in packet loss. Thus based on these three cases of delay trends between packets belonging to the same train, namely constant delay, variable increasing delay and packet loss, the receiver can conclude that the transmission rate is below, slightly higher and significantly higher than the average Available Bandwidth (AVB) respectively. The sender and receiver keep fine tuning the packet train transmission rate based on these trends till they converge onto a narrow range of estimated Available Bandwidth (AVB). But a drawback of the Available Bandwidth Measurement Tools (ABMT) is the significant amount of probe packet traffic introduced by these Available Bandwidth Measurement Tools (ABMT) into the network.

DESCRIPTION OF THE PRIOR ART

Some of the problems associated with the overheads in the existing Available Bandwidth Measurement Tools (ABMT) are listed below:

Problems of the Prior Art

1. The main disadvantage of existing Available Bandwidth Measurement Tools (ABMT) is the significant amount of extra traffic it introduces in the network. As mentioned earlier, each packet inside a train consists of fixed length network layer header, transport layer header and an appropriately chosen amount of packet payload. This results in significant amount of extra byte consumption by the Cloud Computing Environment (CCE) user and hence the Cloud Computing Environment (CCE) user's average monthly internet billing cost may increase significantly if ABMTs are used.
2. Available Bandwidth Measurement Tools (ABMT) usually chose random junk data to fill the packet payload, instead of Useful Application Data (UAD), as there may be good percentage of packet loss during the measurement process. This is due to the fact that these tools would have to try sending data at higher rates than the AVB and during such times packet losses would be significant. Since the probing data rate keeps varying during the measurement process, a portion of the probe data may be lost in the network. Due to this lossy property, Available Bandwidth Measurement Tools (ABMT) do not include useful data as part of the probe packet payload and instead send useless/junk data. Sending useless data as packet payload serves the dual purpose of creating the required amount of traffic to load the network, and simultaneously not resulting in application data loss. But this results in high internet billing cost to end users and also introduces lot of useless data in the network.
3. In Cloud Computing Environments (CCEs), there is hardly any evidence of repeatedly measuring Available Bandwidth (AVB) and choosing the RAPPs based on the average Available Bandwidths (AVB). Even if Available Bandwidths (AVBs) are being measured in Cloud Computing Environment (CCE), the frequency of the measurements would be limited considering the significant increase in billing cost.
4. Also in Cloud Computing Environments (CCEs), Available Bandwidths (AVB) may be measured at a specific time, considering the significant amount of traffic overhead introduced by Available Bandwidth Measurement Tools (ABMT). Hence the average Available Bandwidths (AVB) calculated through such measurements may not be able to reflect the true value (if it were averaged out by taking sample values at different times in a day). Available Bandwidths (AVB) generally vary significantly at different times of the day. For example, during peak business hours, the Available Bandwidth (AVB) may be low, whereas during off-peak times/nights, the Available Bandwidths (AVB) may be higher. Hence a good estimate of the AVB should be arrived at based on frequent measurements and also by calculating a moving weighted average value based on these measurements.

Whereby, it is desirable to provide a system and method for integrating useful data which will avoid the problems/disadvantages noted above and overcome other problems encountered in conventional methods. The objects, advantages and novel features of the invention may be realized and obtained by means of the instrumentalities and combinations particularly pointed out in the detailed description when taken in conjunction with the accompanying drawings.

OBJECTS OF THE INVENTION

One or more of the problems of the conventional prior art may be overcome by various embodiments of the present invention. Accordingly, the primary object of the present invention is to provide a system and method for integrating useful data while measuring available bandwidth between a cloud computing client device and a server farm.

Another object of the present invention is directed to a method of integrating useful data with Available Bandwidth Measurement Tools (ABMTs), especially for Cloud Computing Environment (CCEs).

A further object of the present invention is directed to a method of integrating useful application data carried inside probe packets, by tools that estimate available bandwidth between two nodes connected through the interne (cloud).

A still further object of the present invention is directed to a method to overcome application data loss that typically happens during the available bandwidth estimation process.

Another object of the present invention is directed to a method, wherein Available Bandwidth Measurement Tool is adapted to vary the packet inter-transmission time to achieve the desired rate of transmission per second.

It is another object of the present invention to provide a method, wherein the Available Bandwidth Measurement Tool is adapted to have constant probe packet sizes without changing the size of the probe packets for the packet trains.

It is another object of the present invention, wherein the Available Bandwidth Measurement Tool's core bandwidth measurement logic is left undisturbed while integrating useful application data, thereby not affecting the accuracy of the available bandwidth.

It is another object of the present invention, wherein the Available Bandwidth Measurement Tool is capable of transmitting a complete unit of application data (file) even in the case where the tool completes estimating the available bandwidth but still there is some more application data remaining, wherein said Transmission Control Protocol Packet Loss Recovery channel (retransmission channel) is also used by the tool to transfer the remaining left over useful data.

It is another object of the present invention, wherein the Available Bandwidth Measurement Tool is capable of calculating the available bandwidth between said two end nodes multiple times in cases where the amount of useful application data to be transferred significantly exceeds the amount of probe packet payload required for measuring the available bandwidth once.

It is another object of the present invention is directed to a system, wherein additional separate TCP Packet Loss Recovery Channel (TCP-PLRC) is used to overcome data loss.

It is another object of the present invention, wherein the TCP Packet Loss Recovery Channel (TCP-PLRC) transmits lost packets in the UDP-Probe channel and retransmits such lost packets.

It is another object of the present invention, wherein Cloud Computing Environment (CCE) user's internet usage billing reduces significantly and also Available Bandwidth Measurement Tools (ABMT) could be run more frequently without significant increase in billing.

SUMMARY OF THE INVENTION

Thus according to the basic aspect of the present invention there is provided a method for integrating useful application data as probe packet payloads while measuring available bandwidth between two nodes (sender and receiver) of a computer network comprising:
choosing an Available Bandwidth Measurement Tool that is adapted to vary the packet inter-transmission time to achieve the desired rate of transmission per second;
transmitting packet trains, wherein said packet train transmits a complete block of said User Application Data as part of its probe data payload, thereby enabling said Available Bandwidth Measurement Tool in calculating the actual Available Bandwidth using User Datagram Protocol channel; and
a Transmission Control Protocol Packet Loss Recovery channel at said two nodes of said Available Bandwidth Measurement Tool to transmit lost packets (sub-blocks) in said User Datagram Protocol-Probe channel,
wherein said User Application Data is the actual packet train data at agreed rates,
wherein said Transmission Control. Protocol Packet Loss Recovery channel is used to retransmit said lost packets,
wherein said Available Bandwidth Measurement Tool is used to transmit said User Application Data as part of the probe packet payloads, thereby simultaneously measuring said Available Bandwidth in the path between said two nodes and also transferring useful data between said two nodes,
wherein said Available Bandwidth Measurement Tool is adapted to have constant probe packet sizes without changing the size of said probe packets for said packet trains,
wherein said Available Bandwidth Measurement Tool's core bandwidth measurement logic is left undisturbed while integrating useful application data, thereby not affecting the accuracy of the available bandwidth,
wherein said Available Bandwidth Measurement Tool is capable of transmitting a complete unit of application data (file) even in the case where the tool completes estimating the available bandwidth but still there is some more application data remaining, wherein said Transmission Control Protocol Packet Loss Recovery channel (retransmission channel) is also used by the tool to transfer the remaining left over useful data, and
wherein said Available Bandwidth Measurement Tool is capable of calculating the available bandwidth between said two end nodes multiple times in cases where the amount of useful application data to be transferred significantly exceeds the amount of probe packet payload required for measuring the available bandwidth once.

According to an aspect of the invention there is provided a method, wherein said integrating of useful application data inside available bandwidth measurement tool comprising:
splitting said User Application Data file into contiguous logical partitions referred as Blocks;
splitting each said block into smaller sub-units referred as sub-blocks;
sending a block exactly inside a packet train;
using a suitable User Application Data file sub-block as packet payload for probe packets to be sent inside a packet train;
assigning said blocks and sub blocks of said each User Application Data file with numbers;
communicating the size of said User Application Data file between said two nodes through said Transmission Control Protocol channel before the actual measurement process starts through said User Datagram Protocol-Probe channel; and
maintaining matrix for each block at one of said two nodes, wherein said matrix comprises one bit flag for each sub-block inside the block,
wherein each sub-block position inside the said matrix is marked as "1" (received) whenever a particular sub-block is correctly received,
wherein said block is sent by choosing the size of each said sub-blocks equal to that of the packet payload size of said available bandwidth measurement tool and the number of said sub-blocks inside each block to be equal to the number of packets sent inside each packet train of available bandwidth measurement tool, and
wherein said each packet includes the block number and sub-block number as metadata, along with the corresponding said User Application Data file sub-block data.

According to a further aspect of the invention, wherein said measuring process of available bandwidth comprising:
sending packet trains one after the other at different rates;
estimating said available bandwidth;
detecting for lost/corrupted packets, inside each of said numbered packet train by examining sub-block numbers;
extracting the said sub-block data from the correctly received packets of said each packet train; and
calculating the exact offset of said particular sub-block to be saved in the output file at the receiving node and updating said block's matrix,
wherein said estimation is completed without interruption and there by without affecting said core available bandwidth measurement process,
wherein during said measurement process, the next expected block number to be sent as part of the next packet train is communicated between said two nodes through said Transmission Control Protocol channel, and
wherein said packet trains are sent until either the Available Bandwidth Measurement Tool measurement logic converges to a specific available bandwidth range or till the user application file data is completely transmitted.

In accordance with a further preferred aspect of the invention, wherein retransmissions of lost sub-blocks through said Transmission Control Protocol Packet Loss Recovery channel comprising:
examining and finding out the number of correctly received sub-blocks of said block through said matrix;
checking out the percentage of correctly received sub-blocks within a received block; retransmitting said lost sub-blocks; and
continuing with the next block in order,
wherein if the said percentage of correctly received sub-blocks of a block is greater than a pre-configured threshold, then the receiving node requests for retransmission of said lost/missed sub-blocks alone through said Transmission Control Protocol Packet Loss Recovery channel,
wherein if the said percentage of correctly received sub-blocks of a block is equal to or lesser than a pre-configured threshold, then the receiving node requests for retransmission of the entire block inside packet payloads of the next packet train, over said User Datagram Protocol-Probe channel,
wherein said received sub-blocks from one or more packet trains could be combined through said Transmission Control Protocol Packet Loss Recovery channel to minimize retransmissions, and wherein each of said retransmitted sub-blocks is sent only once between said two nodes through said Transmission Control Protocol Packet Loss Recovery channel due to lossless nature of Transmission Control Protocol.

According to a further aspect of the invention, wherein if said Available Bandwidth Measurement Tool measurement logic converges to a specific available bandwidth range, the rest of the blocks/sub-blocks yet to be sent are transmitted through said Transmission Control Protocol Packet Loss Recovery channel.

According to a further aspect of the invention, wherein said two nodes are adapted to restart said available bandwidth measurement process by appropriate communication through said Transmission Control Protocol channel if the amount of left over user application data is sufficient to be used as packet payloads for one or more instances of available bandwidth measurement.

According to a further aspect of the invention there is provided a method, wherein if the size of said user application data is less than the average cumulative packet payload traffic required by said Available Bandwidth Measurement Tool, choice in the order of priority is made among the following options:
(a) choosing the size of said user application data approximately equal to the average cumulative packet payload traffic,
(b) for sending small user application data files, combine/accumulate the total size approximately equal to the average cumulative packet payload traffic required by said Available Bandwidth Measurement Tool, before starting said measurement process, and
(c) if neither choice of size nor small user application data files is suitable, after completely sending the user application data file, send dummy data as part of packet payloads in subsequent packet trains till said Available Bandwidth Measurement Tool algorithm converges.

The details for the invention, its object and advantages are explained hereunder in greater details in relation to non-limiting exemplary illustration as per the accompanying figures as detailed hereunder:

BRIEF DESCRIPTION OF THE INVENTION

FIG. 1: is the schematic illustration of a typical Cloud Computing Environment with available bandwidth measurement processes running inside a Network Computer and a Bandwidth Measurement Server in the Server Farm.

Figure 2:
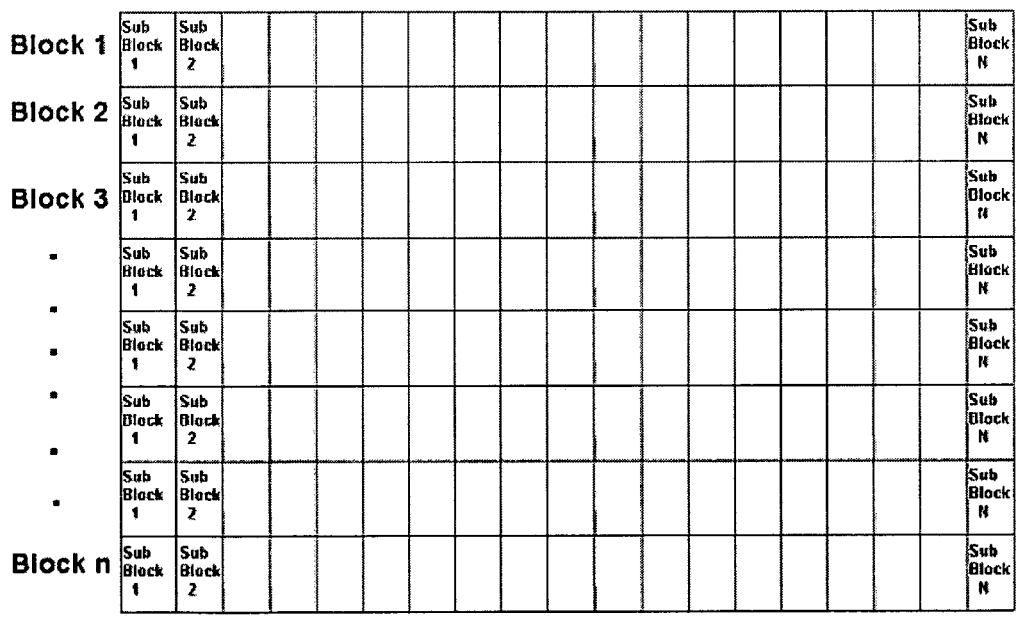

FIG. 2: is the schematic illustration of splitting of User Application Data into equal sized Blocks and Sub-Blocks.

Figure 3:
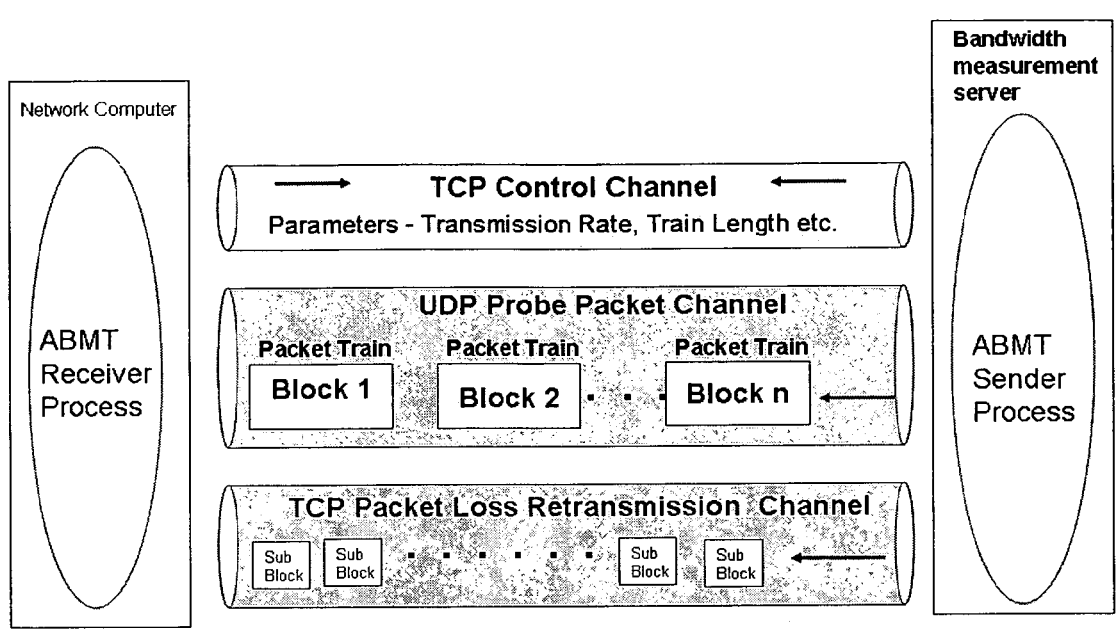

FIG. 3: is the schematic illustration of the three logical network pipes running between the Network Computer and the Bandwidth Measurement Server, for integration of Useful Application Data with an Available Bandwidth Measurement Tool.

DETAILED DESCRIPTION OF THE INVENTION WITH REFERENCE TO THE ACCOMPANYING DRAWINGS

As already described, the present invention is directed to provide a system and method for integrating useful data while measuring available bandwidth between a cloud computing client device and a server farm. More particularly, the present invention is directed to a method for integrating useful application data as probe packet payloads while measuring available bandwidth by tools between two nodes of a computer network connected through the interne (cloud) especially for Cloud Computing Environments (CCEs).

Reference is first invited to the accompanying FIG. 1 that illustrates schematically a typical cloud computing environment with available bandwidth measurement processes running inside a Network Computer and a Bandwidth Measurement Server in the Server Farm. Available Bandwidth (AVB) between two end points in a network is defined as the actual raw bit rate that the end points are successfully able to transfer between them at a given instant of time over the network. While measuring Available Bandwidth (AVB) in the downstream direction of the Network Computer (NC), the Available Bandwidth Measurement Tool (ABMT) process at the Network Computer (NC) would be the receiver of probe data and the Available Bandwidth Measurement Tool (ABMT) process at the bandwidth measurement server end would be the sender of probe data.

Accompanying FIG. 2 illustrates splitting of User Application Data into equal sized Blocks and Sub-Blocks. The sub-block size (number of bytes) is chosen based on the probe packet payload length used by the Available Bandwidth Measurement Tools (ABMT). The block size (number of sub-blocks within a block) is chosen based on the number of packets sent inside one packet train by the Available Bandwidth Measurement Tools (ABMT).

Reference is first invited to the accompanying FIG. 3 that illustrates the three network connections between the Available Bandwidth Measurement Tools (ABMT) sender and receiver process. Available Bandwidth Measurement Tools (ABMT) usually use two transport layer channels between the two nodes (sender and receiver), namely, a reliable TCP (Transmission Control Protocol) channel for transferring control messages (TCP-Control) and a best-effort lightweight UDP (User Datagram Protocol) channel (UDP-Probe) for transferring the actual probe data in the form of packet trains. The TCP-Control channel is used in a bi-directional manner by the sender and receiver to communicate meta-data, like currently agreed packet transmission rate, packet size, number of packets inside each packet train etc. The UDP-Probe channel basically carries packet trains and each packet train carries a complete, block of User Application Data (UAD) as part of its probe data payload. The User Datagram Protocol-Probe channel carry the actual packet train data at agreed rates, to enable the ABMTs in calculating the actual Available Bandwidth (AVB). The data packets are lost in the UDP-Probe channel, when the sender side of Available Bandwidth Measurement Tools (ABMT) transmits at a rate higher than the Available Bandwidth (AVB) of the network. To overcome this data loss, the present invention is directed to provide additional separate TCP Packet Loss Recovery Channel (TCP-PLRC) channel to carry those sub-blocks that have been lost while being transmitted in the UDP-Probe channel.

Thus according to the preferred aspect of the present invention, the Transmission Control Protocol Packet Loss Recovery channel retransmits the lost packets. The Available Bandwidth Measurement Tool transmits the User Application Data as part of the probe packet payloads, thereby simultaneously measuring said Available Bandwidth in the path between the two nodes and also transferring useful data between the two nodes (sender and receiver). Moreover the Available Bandwidth Measurement Tool transmits constant probe packet sizes without changing the size of the probe packets for the packet trains. Advantageously, its core bandwidth measurement logic is left undisturbed while integrating useful application data, thereby not affecting the accuracy of the available bandwidth. The Available Bandwidth Measurement Tool is also capable of transmitting a complete unit of application data (file) even in the case where the tool completes estimating the available bandwidth but still there is some more application data remaining, wherein the Transmission Control Protocol Packet Loss Recovery channel (retransmission channel) is also used by the tool to transfer the remaining left over useful data. Also the tool is capable of calculating the available bandwidth between said two end nodes multiple times in cases where the amount of useful application data to be transferred significantly exceeds the amount of probe packet payload required for measuring the available bandwidth once.

According to present invention the method for integrating useful application data inside available bandwidth measurement tools (ABMT) is detailed as follows:

Consider the User Application Data (UAD) as a file. Split the UAD file into contiguous logical partitions named as Blocks (BLK) at the highest level. At the next level, split each block into smaller sub-units named as sub-blocks (S-BLK). Send a block (BLK) exactly inside a packet train by choosing the size of each sub-block (S-BLK) equal to that of the packet payload size of ABMTs and the number of S-BLKs inside each BLK to be equal to the number of packets sent inside each packet train of ABMT. As an example, if an ABMT uses a packet payload size of 300 bytes and a packet train size of 50 packets, then the UAD file would be split into BLKs and S-BLKs, with the size of each S-BLK equal to 300 bytes and each BLK would have 50 S-BLKs. A separate TCP Packet Loss Recovery Channel is added in the ABMT tool to reliably carry lost packets in the UDP-Probe channel. The AMBT tool is also modified to use an appropriate UAD file S-BLK as packet payload for probe packets sent inside packet trains, instead of the usual random junk data.

A Block number is given to each Block (BLK) and a Sub-block number is given to each Sub-Block (S-BLK) of the UAD file. The size of the UAD file is communicated between the two nodes/by the receiver to the sender either through the TCP-Control channel or through the TCP Packet Loss Recovery channel, before the actual measurement process starts through the UDP-Probe channel. Initially, both the sender and receiver start with the first block number. At every stage of the measurement process, the receiver communicates to the sender the next expected block number to be sent as part of the next packet train. This information is sent through the TCP-Control channel. The ABMT starts its usual AVB measurement process by sending packet trains, one after the other at different rates, provided that each packet train carries a complete block (BLK) of User Application Data (UAD). Within a packet train, each packet payload consists of sub-blocks belonging to that block number. The packet trains are then sent over the UDP-Probe channel. Each packet contains the block number and sub-block number as metadata, along with the corresponding UAD S-BLK data.

On receiving a packet train, the receiver does the usual calculations required for estimating the AVB. This process is completed first without interruption so that the core AVB measurement process is not affected. After the core AVB estimation processing is over for that packet train, additional logic is added to the ABMT to check for lost/corrupted packets, inside each packet train. Since each packet inside a packet train is numbered, detecting the set of lost/corrupted packet within a particular packet train is straightforward. Since each packet carries UAD, the checksum option of UDP must be turned on to detect packet data corruption. The receiver extracts the Sub-Block (S-BLK) data from the correctly received packets of each packet train and then write it onto their appropriate position inside an output UAD file. Since each packet carries the block number and sub-block number as meta-data and as the total UAD file size is known, the exact offset where a particular S-BLK has to go in the output file can be easily calculated. It does not matter if such packets are not contiguous, as each S-BLK is anyway placed in its exact offset in the UAD file.

The receiver maintains a matrix referred as Received Block Matrix (RCV-BLK-Matrix) for each block (BLK). The matrix has a one bit flag for each Sub-Block (S-BLK) inside the BLK. Whenever a particular S-BLK is correctly received, its position inside the matrix is marked as "1" (received). After writing the correctly received S-BLKs onto the output UAD file and updating the BLK's matrix, the receiver performs the following actions for missing/corrupted packets of that packet train:

The receiver finds out the number of correctly received S-BLKs of the BLK (belonging to the current packet train), by examining the Received Block Matrix (RCV-BLK-Matrix) of the BLK. If the percentage of correctly received S-BLK's within a BLK is greater than a pre-configured threshold, then the receiver requests retransmission of these missing S-BLK's through the TCP-PLRC, by sending an appropriate missing packet list matrix. The receiver also increments the next expected BLK by one and sends this value to the sender through the TCP-Control channel. Since a majority of S-BLK's within a particular BLK has arrived intact, the lost S-BLKs are retransmitted through the TCP-PLRC channel. The main packet train sent on the UDP-Probe channel continues with the next BLK in order.

If the percentage of correctly received S-BLK's within a BLK is equal to or lesser than a pre-configured threshold, then the receiver requests retransmission of the entire BLK, by asking for the same BLK-no as the next expected BLK through the TCP-Control channel. This is done by the receiver not incrementing the next expected BLK value. The sender then retransmits the same BLK again inside packet payloads of the next packet train sent over the UDP-Probe channel.

Even for retransmitted blocks the same logic is applied at the receiver, like the original Block. The only difference is that since the (RCV-BLK-Matrix) is checked first, only those S-BLK's which have been correctly received for the first time would be written onto the output UAD file and their respective bit flags updated in the RCV-BLK-Matrix. Those S-BLK's of this BLK that have already been received intact through earlier transmissions of the same BLK, would not be re-written again. This way, even in a lossy network, correctly received S-BLK's from one or more packet trains could be combined to minimize retransmissions. For retransmitted packets, received through the TCP-PLRC, the receiver does a similar check on the RCV-BLK-Matrix before writing onto the output UAD file. Since TCP is a reliable protocol, each retransmitted S-BLK need to be sent only once from the sender to the receiver through the TCP-PLRC. The ABMT method/algorithm proceeds by sending packet trains at different rates, until either the ABMT measurement logic converges to a specific AVB range or till the UAD file data is completely transmitted.

Where the AVB measurement convergence happens first (before UAD is completely exhausted), then the rest of the BLKs/S-BLKs yet to be sent are transmitted through the TCP-PLRC, by the receiver sending appropriate trigger to the sender over TCP-PLRC. If the amount of left over UAD is big enough to be used a packet payloads for one more instance of AVB measurement, then the two end points could restart the AVB measurement process one more time, by appropriate communication through the TCP-Control channel.

Where the UAD file size is less than the average cumulative packet payload traffic required by the ABMT (this can be found from some sample tests), choice in the order of priority is made among the following options:

a) Choose the size of the UAD so that it is approximately equal to the average cumulative packet payload traffic required by the ABMT.

b) If it is required to send small UAD files, then combine/accumulate sufficient number of UAD files, so that the total size is approximately equal to the average cumulative packet payload traffic required by the ABMT, before starting the ABMT measurement process.

c) If both the above choices are not suitable for a particular CCE, then once the UAD file data has been completely sent by the ABMT sender, it can send dummy data as part of packet payloads in subsequent packet trains till the ABMT algorithm converges.

Thus the present invention is used to transmit User Application Data (UAD) as part of the probe packet payloads, while simultaneously measuring the Available Bandwidth (AVB) in the path between the two nodes (sender and receiver). Moreover, the Available Bandwidth Measurement Tool's core bandwidth measurement logic is left undisturbed while integrating useful application data, thereby not affecting the accuracy of the available bandwidth. Advantageously the present invention would be useful in CCEs, where a lot of information is exchanged between Network Computer (NC) and Server Farm (SF) (e.g. advertisements, software upgrades etc.). Moreover, the Cloud Computing Environment (CCE) user's interne usage billing reduces significantly and also Available Bandwidth Measurement Tools (ABMT) could be run more frequently without significant increase in billing.

We claim:

1. A method for integrating useful application data as probe packet payloads while measuring available bandwidth between two nodes (sender and receiver) of a computer network comprising:

choosing an Available Bandwidth Measurement Tool that is adapted to vary the packet inter-transmission time to achieve the desired rate of transmission per second;

transmitting packet trains, wherein said packet train transmits a complete block of said User Application Data as part of its probe data payload, thereby enabling said Available Bandwidth Measurement Tool in calculating the actual Available Bandwidth using User Datagram Protocol channel; and a Transmission Control Protocol Packet Loss Recovery channel at said two nodes of said Available Bandwidth Measurement Tool to transmit lost packets (sub-blocks) in said User Datagram Protocol-Probe channel, wherein said User Application Data is the actual packet train data at agreed rates, wherein said Transmission Control Protocol Packet Loss Recovery channel is used to retransmit said lost packets, wherein said Available Bandwidth Measurement Tool is used to transmit said User Application Data as part of the probe packet payloads, thereby simultaneously measuring said Available Bandwidth in the path between said two nodes and also transferring useful data between said two nodes, wherein said Available Bandwidth Measurement Tool is adapted to have constant probe packet sizes without changing the size of said probe packets for said packet trains, wherein said Available Bandwidth Measurement Tool's core bandwidth measurement logic is left undisturbed while integrating useful application data, thereby not affecting the accuracy of the available bandwidth, wherein said Available Bandwidth Measurement Tool is capable of transmitting a complete unit of application data (file) even in the case where the tool completes estimating the available bandwidth but still there is some more application data remaining, wherein said Transmission Control Protocol Packet Loss Recovery channel (retransmission channel) is also used by the tool to transfer the remaining left over useful data, and wherein said Available Bandwidth Measurement Tool is capable of calculating the available bandwidth between said two end nodes multiple times in cases where the amount of useful application data to be transferred significantly exceeds the amount of probe packet payload required for measuring the available bandwidth once.

2. The method as claimed in claim 1 wherein said integrating of useful application data inside available bandwidth measurement tool comprising:

splitting said User Application Data file into contiguous logical partitions referred as Blocks;

splitting each said block into smaller sub-units referred as sub-blocks;

sending a block exactly inside a packet train;

using a suitable User Application Data file sub-block as packet payload for probe packets to be sent inside a packet train;

assigning said blocks and sub blocks of said each User Application Data file with numbers;

communicating the size of said User Application Data file between said two nodes through said Transmission Control Protocol channel before the actual measurement process starts through said User Datagram Protocol-Probe channel; and maintaining matrix for each block at one of said two nodes, wherein said matrix comprises one bit flag for each sub-block inside the block, wherein each sub-block position inside the said matrix is marked as "1" (received) whenever a particular sub-block is correctly received, wherein said block is sent by choosing the size of each said sub-blocks equal to that of the packet payload size of said available bandwidth measurement tool and the number of said sub-blocks inside each block to be equal to the number of packets sent inside each 30 packet train of available bandwidth measurement tool, and wherein said each packet includes the block number and sub-block number as metadata, along with the corresponding said User Application Data file sub-block data.

3. The method as claimed in claim 2 wherein said measuring process of available bandwidth comprising:

sending packet trains one after the other at different rates;

estimating said available bandwidth;

detecting for lost/corrupted packets, inside each of said numbered packet train by examining sub-block numbers;

extracting the said sub-block data from the correctly received packets of said each packet train; and calculating the exact offset of said particular sub-block to be written onto the output file and updating said block's matrix, wherein said estimation is completed without interruption and there by without affecting said core available bandwidth measurement process, wherein during said measurement process, the next expected block number to be sent as part of the next packet train is communicated between said two nodes through said Transmission Control Protocol channel, and wherein said packet trains are sent until either the Available Bandwidth Measurement Tool measurement logic converges to a specific available bandwidth range or till the user application file data is completely transmitted.

4. The method as claimed in claim 1, wherein retransmissions of lost sub-blocks through said Transmission Control Protocol Packet Loss Recovery channel comprising:

examining and finding out the number of correctly received sub-blocks of said block through said matrix;

checking out the percentage of said received block;

retransmitting said lost sub-blocks; and continuing with the next block in order, wherein if the said percentage of received block is greater than a pre-configured threshold, then the receiving node requests for retransmission of said lost/missed sub-blocks through said Transmission Control Protocol Packet Loss Recovery channel, wherein if the said percentage of received block is equal to or lesser than a pre-configured threshold, then the receiving node requests for retransmission of the entire block inside packet payloads of the next packet train, over said User Datagram Protocol-Probe channel;

wherein said received sub-blocks from one or more packet trains could be combined to minimize retransmissions, and wherein each of said retransmitted sub-blocks is sent only once between said two nodes through said Transmission Control Protocol Packet Loss Recovery channel.

5. The method as claimed in claim 1, wherein if said Available Bandwidth Measurement Tool measurement logic converges to a specific available bandwidth range, the rest of the blocks/sub-blocks yet to be sent are transmitted through said Transmission Control Protocol Packet Loss Recovery channel.

6. The method as claimed in claim 1, wherein said two nodes are adapted to restart said available bandwidth measurement process by appropriate communication through said Transmission Control Protocol channel if the amount of left over user application data is sufficient to be used a packet payloads.

7. The method as claimed in claim 1, wherein if the size of said user application data is less than the average cumulative packet payload traffic required by said Available Bandwidth Measurement Tool, choice in the order of priority is made among the following options:

(a) choosing the size of said user application data approximately equal to the average cumulative packet payload traffic, (b) for sending small user application data files, combine/accumulate the total size approximately equal to the average cumulative packet payload traffic required by said Available Bandwidth Measurement Tool, before starting said measurement process, and (c) if neither choice of size nor small user application data files is suitable, after completely sending the user application data file, send dummy data as part of packet payloads in subsequent packet trains till said Available Bandwidth Measurement Tool algorithm converges.

* * * * *